US007383983B2

(12) United States Patent
Gaumond et al.

(10) Patent No.: US 7,383,983 B2
(45) Date of Patent: *Jun. 10, 2008

(54) SYSTEM AND METHOD FOR MANAGING CONTENT BETWEEN DEVICES IN VARIOUS DOMAINS

(75) Inventors: Michael T. Gaumond, Scottsdale, AZ (US); Richard Mark Clayton, Phoenix, AZ (US); Parvathy Bhaskaran, Mesa, AZ (US); Lee Callaway, Oak Park, IL (US)

(73) Assignee: General Instrument Corporation, Horsham, PA (US)

( * ) Notice: Subject to any disclaimer, the term of this patent is extended or adjusted under 35 U.S.C. 154(b) by 195 days.

This patent is subject to a terminal disclaimer.

(21) Appl. No.: 11/118,528

(22) Filed: Apr. 29, 2005

(65) Prior Publication Data
US 2005/0252959 A1    Nov. 17, 2005

Related U.S. Application Data

(60) Provisional application No. 60/574,601, filed on May 7, 2004.

(51) Int. Cl.
*G06F 17/00* (2006.01)
*G06K 19/06* (2006.01)
(52) U.S. Cl. ...................... 235/375; 235/492
(58) Field of Classification Search ............... 235/375, 235/492; 340/425.5; 709/217
See application file for complete search history.

(56) References Cited

U.S. PATENT DOCUMENTS

| 6,389,463 | B2* | 5/2002 | Bolas et al. ................. 709/219 |
| 7,050,834 | B2* | 5/2006 | Harwood et al. ........... 455/563 |
| 7,079,015 | B2* | 7/2006 | Gibeau .................... 340/425.5 |
| 7,171,221 | B1* | 1/2007 | Amin et al. ................. 455/462 |
| 2002/0183059 | A1* | 12/2002 | Noreen et al. ............... 455/427 |
| 2005/0009561 | A1* | 1/2005 | Hollstrom et al. ....... 455/556.1 |

\* cited by examiner

*Primary Examiner*—Steven S. Paik
*Assistant Examiner*—April A Taylor
(74) *Attorney, Agent, or Firm*—Stewart M. Wiener

(57) ABSTRACT

A system and method for managing content between different client devices in various domains (such as vehicle, home, and person). The system and method include receiving an input from a user on the first client device to pause the content. After receiving the input, the first client device determines whether the first client device is connected to a wireless communication system. If the first client device is connected to the wireless communication system, the first client device sends a data message to the second client device through a host system. In one embodiment, the second client device will then store the content in the second client device after receiving the data message to permit the user to resume playback of the content on the second client device. In another embodiment, the host system will store the content itself or access the content from a content provider and transfer the content directly to the second device with a data message that indicates the paused location of the content.

41 Claims, 9 Drawing Sheets

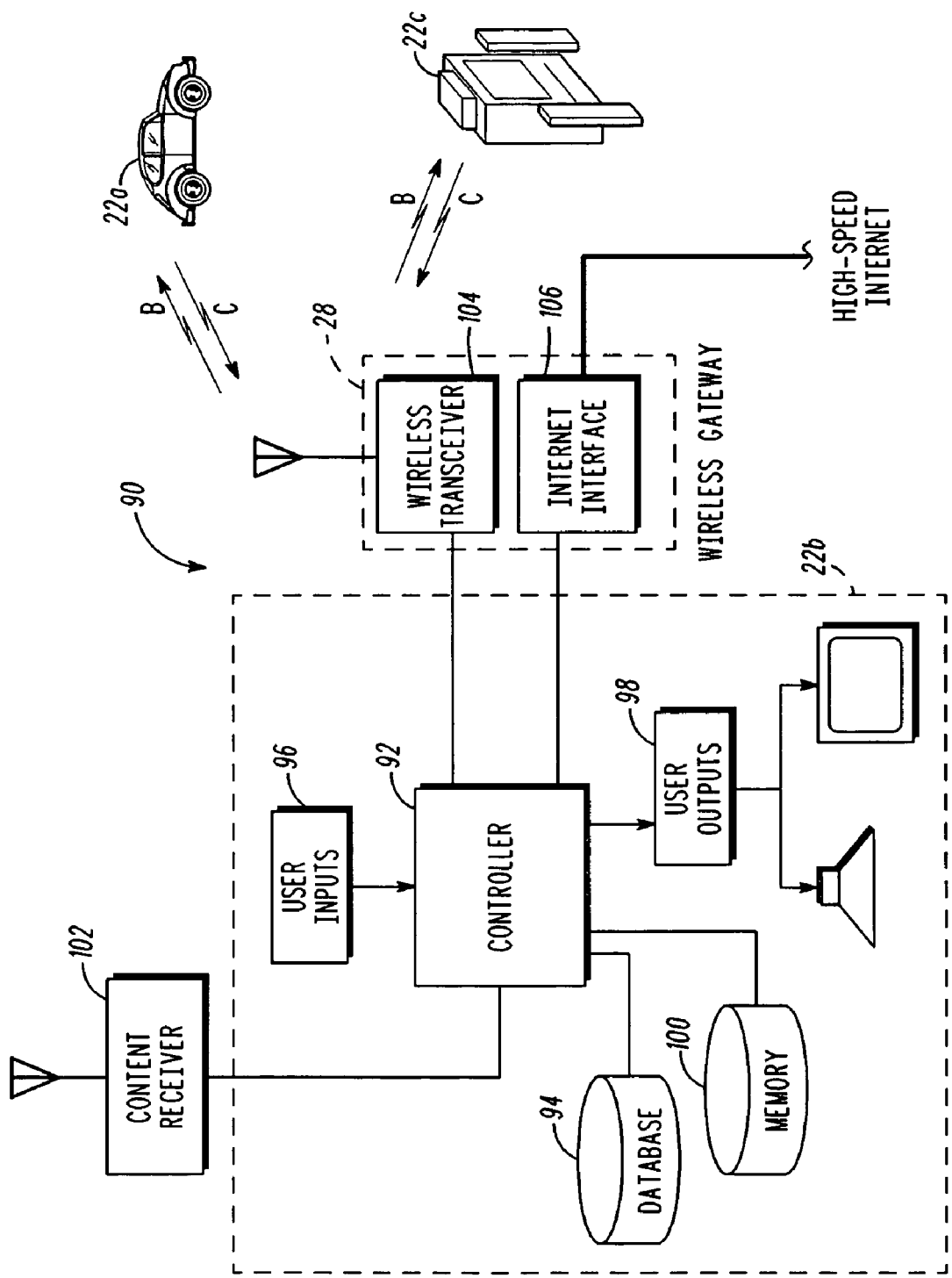

USER 1

| DEVICE ID 122 | CLIENT TYPE 124 | DOMAIN 126 | SHORT-RANGE TRANSCEIVER 128 | CELLULAR TRANSCEIVER 130 | MEMORY SIZE 132 | STORED CONTENT 134 | INTERNET CONTENT 136 | SATELLITE CONTENT 138 | RF RADIO CONTENT 140 | CABLE TV CONTENT 142 | ⋮ ⋮ |
|---|---|---|---|---|---|---|---|---|---|---|---|
| D1 | HEAD-UNIT | VEHICLE | Y | Y | XXX | Y | N | Y | Y | N | |
| D2 | PC | HOME | Y | N | XXX | Y | Y | Y | N | N | |
| D3 | AUDIO RECORDER | HOME | Y | N | XXX | Y | N | N | N | N | |
| D4 | VIDEO RECORDER | HOME | Y | N | XXX | Y | N | Y | N | N | |
| D5 | CELL PHONE | PERSON | Y | Y | XXX | Y | N | N | N | N | |
| D6 | MP3 PLAYER | PERSON | Y | N | XXX | Y | N | N | N | N | |
| D7 | PDA | PERSON | Y | Y | XXX | Y | Y | N | N | N | |
| ... | ... | ... | ... | ... | ... | ... | ... | ... | ... | ... | |

*FIG. 7*

SYSTEM AND METHOD FOR MANAGING CONTENT BETWEEN DEVICES IN VARIOUS DOMAINS

CROSS-REFERENCE TO RELATED APPLICATION

The instant application claims priority to U.S. Provisional Patent Application No. 60/574,601, filed May 7, 2004.

FIELD OF THE INVENTION

This invention in general relates to managing content between devices in various domains and, more particularly, to a system and method for pausing content in one device and resuming playback of the content in another device that may be in a different domain.

BACKGROUND OF THE INVENTION

Digital video recorders exist that allow a user to pause and store video content and playback the video content at a later time. Conventional systems, however, are limited in that they only deal with storing video content and playing back the content in a single domain.

A need exists for a user to seamlessly listen to (or watch) audio (or video) content when moving from one domain (such as a vehicle) to a different domain (such as a home) without missing a portion of that content. For instance, assume that a user is driving in their vehicle and listening to an audio broadcast content such as a talk show or a sporting event. When the user arrives at their home and parks the vehicle, the user may wish to continue listening to the broadcast content at a later time and, preferably, in a different domain (such as their home). Currently, the user cannot pause the broadcast content in the vehicle and resume the broadcast content at the exact spot later in their home. The same applies for video, e.g., pause a digital video recorder at home and resume playing the video content on an entertainment system in the vehicle.

It is, therefore, desirable to provide a system and method to overcome or minimize most, if not all, of the preceding problems especially in the area of managing content in different domains.

BRIEF DESCRIPTION OF THE DRAWINGS

FIG. 6 is a block diagram of one embodiment of a communication system that communicates with different client devices in different domains;

FIG. 7 is a diagram of one embodiment of a database that may reside in a host system to access information and characteristics about a particular client device;

Figure 1:
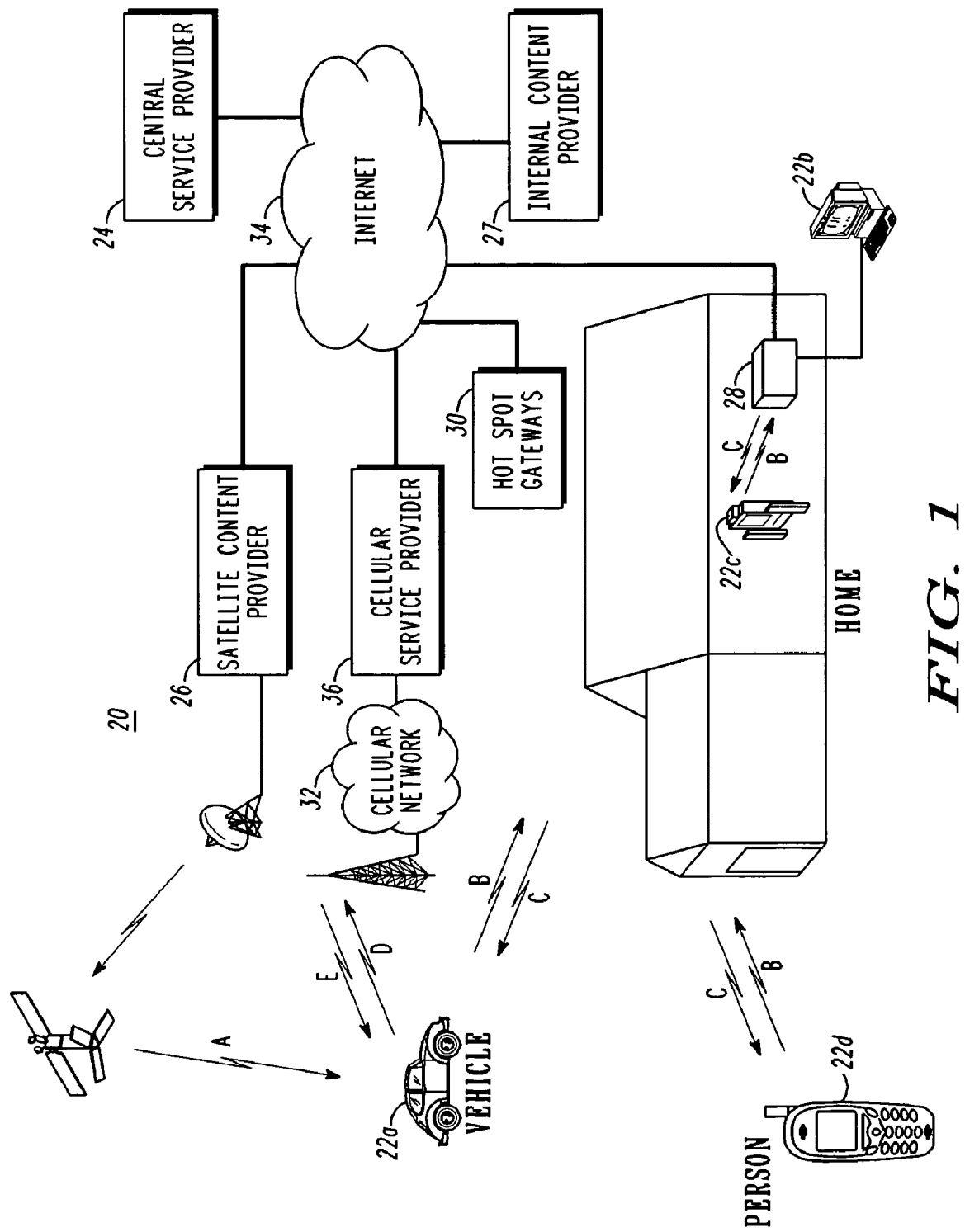
FIG. 1 is a block diagram of a system having client devices in different domains supported by a server at a central service provider.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for managing content between different client devices in various domains (such as vehicle, home, person, hotspot, workplace, or school). To this end, in one embodiment there is a method for managing content between a first client device and a second client device. The method comprises the steps of: receiving an input from a user on the first client device to pause the content, determining whether the first client device is connected to a first wireless communication system, sending a data message to the second client device if the first client device is connected to the first wireless communication system; and storing the content in the second client device after receiving the data message to permit the user to resume playback of the content on the second client device.

The content may be a variety of types including broadcast content and stored content. Broadcast content may include digital content such as from a digital satellite communication system. Broadcast content may also include analog or digital content from local radio broadcasters over a radio tuner. The content may also be stored content in that a user may have the system store and manage personal content and content that is accessible from Internet content providers.

In one embodiment, the first communication system is a short-range wireless communication system such as a Bluetooth™ communication system or an IEEE 802.11 communication system. The first device may also include a second transceiver for communication with a second wireless communication system such as a cellular communication network. In a further embodiment, where the first device has a second transceiver, the method may further include the steps of: determining whether the first device is connected to the second wireless communication system and sending the data message over the second wireless communication system if a connection exists. If the first client device is not connected to either the first or second wireless communication system, the first client device may store the data message for later transmission.

In another embodiment, there is a method for managing content between a first client device and a second client device, where the first client device is in a first domain (such as a vehicle) and the second client device is in a second domain (such as in a home or on the person). The method comprises the steps of: receiving an input from a user on the first device to pause the content; determining whether the first device is connected to a first wireless communication system; and sending a data message to a wireless gateway if the first device is connected to the first wireless communication system. Here, the data message sent to the wireless gateway comprises a plurality of information elements that includes at least a pause content instruction. If the content is broadcast content, the information elements in the data message may further include a content identification (such as a satellite channel identification or a radio frequency identification). The information elements may also include a host address, a content type identification, a user identification, and a date and a time that the user selected the pause content command. If the content is stored content, the information elements in the data message may further include a content identification and a pause location identification as well as other information to enhance user functionality.

In a further embodiment, there is a client device in a communication system where the system is capable of managing content between the client device and other client devices in various domains. The client device includes at least a user interface, a first wireless transceiver, and a controller. The user interface is used to receive an input from a user to pause the content. The first wireless transceiver is capable of wireless connecting the client device to a first wireless communication system. The controller, in response to the input from the user to pause the content, determines whether the client device is connected to the first wireless communication system. If so, the controller generates and sends a data message to a wireless gateway over the first communication system. The data message sent to the wireless gateway includes at least a pause content instruction and any additional information as described briefly above and in more detail below.

In another embodiment, there is a communication system for managing content between a first client device and a second client device. The communication system includes at least a wireless gateway, a database, and a controller. The wireless gateway is configured to receive a first data message from the first client device. The data message comprises a plurality of information elements including at least a pause content instruction. The database is configured to store information regarding the first client device and the second client device. The controller is connected to the wireless gateway and the database. The controller is capable of identifying the second device from the database and sending a second data message (or the content itself) to the second client device in response to receiving the first data message from the first client device.

Now, turning to the drawings, FIG. 1 illustrates a top-level block diagram of an example use of a communication system 20 for the present invention. Generally, the communication system 20 may include a plurality of client devices 22a, 22b, 22c, 22d that exist in various domains such as the vehicle, home, and person. For instance, a client device 22a in the vehicular domain may be incorporated into a vehicle's head unit and/or entertainment system. A client device 22b, 22c in the home domain may include a personal computer, a home entertainment system, a digital audio recorder, and/or a digital video recorder. A client device 22d in the personal domain may include a portable electronic device such as a personal digital assistant (PDA), a digital music player, and/or a portable phone. Client devices may also exist in other domains such as a hotspot, workplace, or school.

The communication system 20 also includes a central service provider 24 that can communicate with the client devices 22a-d through a combination of wireless and wired links. In one embodiment, the central service provider 24 is connected to a high-speed Internet network 34. The central service provider 24 may assist in managing the distribution and control of content between different client devices 22a-d. The central service provider 24 may further provide additional services or be incorporated into the services of other service providers such as a cellular service provider, a satellite broadcast content provider, a cable television content provider, or a stored Internet content provider. Moreover, some or all of the functions of managing the distribution and control of the content between client devices 22a-d may reside locally with a user in the home domain.

In one embodiment, where the client device 22a-d has a content receiver, the client devices 22a-d may receive broadcast content (audio and/or video) from a satellite content provider 26. This is shown in FIG. 1 through an exemplary satellite content provider and the receipt of a communication link A to the client devices 22a-d. In other embodiments, the client device 22a-d may also have a receiver to receive broadcast content via radio signals from local content broadcasters (not shown). The client device 22a-d may also receive stored content from an Internet content provider 27. The Internet content provider 27 may provide stored music or video content to users or be part of a cable television provider. If the client device is a portable or mobile unit (such as a client device 22a in the vehicular domain or a client device 22d in the person domain), as explained in more detail below, the client device may receive stored content from a home gateway 28 or a hot spot gateway 30 through a short-range communication system.

As illustrated in FIG. 1, the client devices 22a-d may wirelessly communicate in the communication system 20 through different communication links (see communication arrows B-E). The wireless communication links B-E may be divided into individual sets (B-C, D-E) for different types of wireless communication protocols. For instance, the client devices 22a-d may include a first wireless transceiver that is capable of establishing a wireless communication link B-C through a short-range wireless communication system or network. In this embodiment, the short-range wireless communication system or network may include a Bluetooth™ communication system or an IEEE 802.11 communication system. The short-range wireless transceiver in a client device 22a-d may provide direct communication to another client device 22a-d through a home wireless gateway 28 (such as from the client device 22a in the vehicle to the client device 22b, 22c in the home). Alternatively, the short-range wireless transceiver in a client device 22a-d may provide indirect wireless communication to another client device through a hot spot gateway 30 (such as from a client device 22a in the vehicle, through the hot spot gateway 30, to the client device 22b, 22c in the home). The wireless communication links over the short-range communication system can provide for the exchange of data messages as well as the transfer of stored content to client devices.

Additionally, the client devices 22a-d may include a second wireless transceiver that is capable of establishing a wireless communication link D-E through a second wireless communication system, such as a cellular communication system and network 32. The cellular communication system and network 32 can operate according to a wireless communication protocol such as a Global System for Mobile Communications (GSM) protocol, a Code Division Multiple Access (CDMA) protocol, or a Time Division Multiple Access (TDMA) protocol. Here, the cellular system or network 32 is further coupled to the Internet 34 by the cellular service provider 36 or other wired network on route to the central service provider 24, which may ultimately act as the host for data message communications between client devices 22a-d. Alternatively, the cellular system or network 32 is coupled to the Internet 34 or other wired network on route to another client device (such as from the client device 22a in the vehicle, through to the cellular network provider 36, to the client device 22b, 22c in the home). The above described wireless communication protocols are merely representative of existing protocols that could be used in the present invention.

Figure 2:
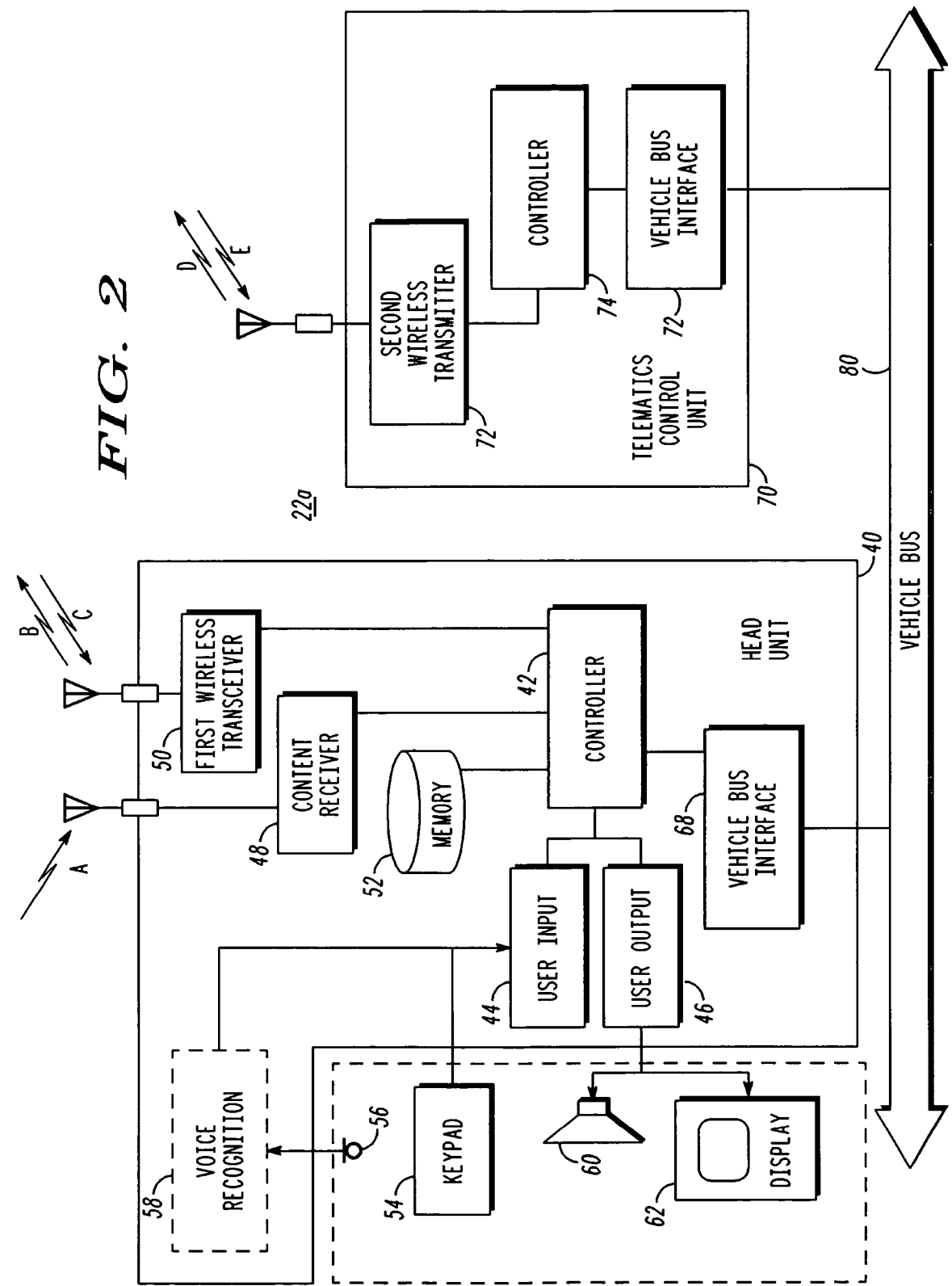
FIG. 2 is a block diagram of one embodiment of a client device.
Figure 3:
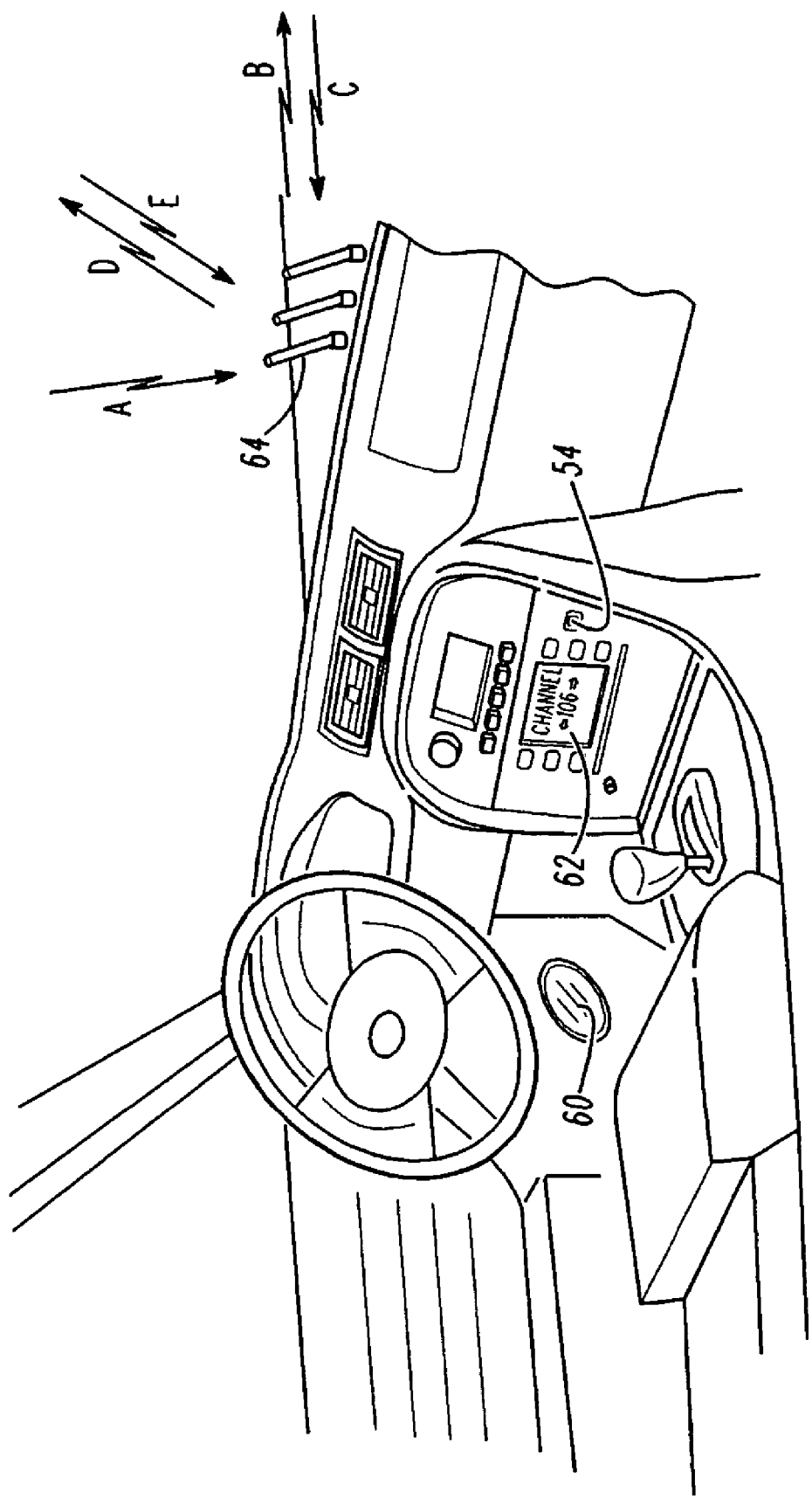
FIG. 3 is a perspective view of the inside of a vehicle illustrating one embodiment of a client device in the vehicular domain.
Figure 4:
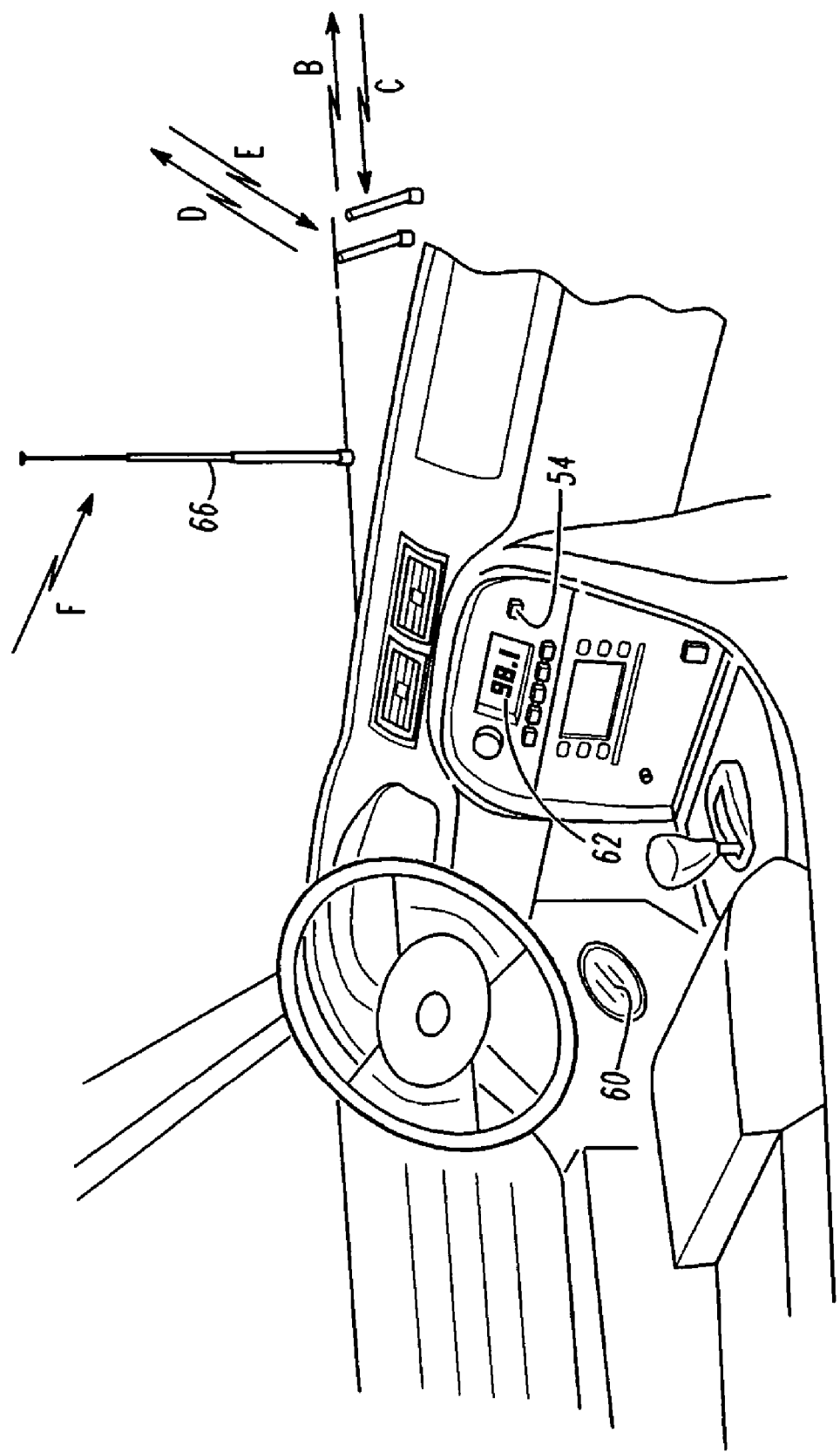
FIG. 4 is a perspective view of the inside of a vehicle illustrating another embodiment of a client device in the vehicular domain.

An exemplary client device 22a in a vehicular domain will now be described in further detail with relation to FIGS. 2-4. In one embodiment, a client device 22a in a vehicle may comprise of two main components: a head unit 40 and a Telematics control unit 70. Although shown as separate components for purposes of illustration, one skilled in the art having the benefit of this disclosure will recognize that aspects of the head unit 40 and the Telematics control unit 70, and components thereof, can be combined or swapped. In any event, in the embodiment as shown in FIG. 2, the head unit 40 may include a controller 42, a user interface 44, 46, a content receiver 48, a first wireless transceiver 50, a memory 52.

The user interface includes a user input 44 and a user output 46. The user input 44 may include a keypad or a specific user dedicated set of buttons 54. The user may use the keypad or dedicated buttons to perform particular functions of the present invention, including a request to pause content or a request to resume playback of content. Additionally, a microphone 56 may also be used to pick up a speaker's voice in the vehicle, and/or possibly to give commands to the head unit 40 if it is equipped with a voice recognition module 58.

Ultimately, user inputs 44 are processed by the controller 42 in the head unit 40. The controller 42 also executes processes to provide outputs to the occupants in the vehicle through the user output 46, such as through a speaker 60 and/or a display 62. The speakers 60 employed can be the audio (radio) speakers normally present in the vehicle, of which there are typically four or more, although only one is shown for convenience.

The content receiver 48 in the client device 22a is capable of receiving broadcast content (audio and/or video) from a content provider 26. This is shown in FIG. 3 through an exemplary satellite content provider by the receipt of a communication link A to the client device 22a. The user may use the user interface to select one of a plurality of satellite channels that are received by the satellite receiver antenna 64. In other embodiments, as shown in FIG. 4, the client device 22a may also have an antenna 66 and a radio receiver to receive broadcast content via radio signals F from local content broadcasters in the geographic area. This type of broadcast content may be obtained through the content receiver 48 by tuning a radio receiver to a specific radio frequency.

Referring back to FIG. 2, the client device 22a may also obtain stored content (as well as exchange data messages with a host system or other client devices) through the use of the first wireless transceiver 50. The first wireless transceiver 50 is used for establishing wireless communications B-C over a short-range wireless communication system or network. For instance, as mentioned above, the short-range wireless communication system or network may include a Bluetooth™ communication system or an IEEE 802.11 communication system. Although shown as part of the head unit 40, the first wireless transceiver 50 could also be included as part of the Telematics control unit 70 or other vehicle control unit. In any event, the short-range wireless transceiver 50 may provide wireless communication to another client device 22b-d over a home gateway 28 (such as a data message from the client device 22a in the vehicle to the client device 22b, 22c in the home) or may provide wireless communication to another client device or content provider through a hot spot gateway 30 (such as a data message from the client device 22a in the vehicle, through the hot spot gateway 30, to the client device 22b, 22c in the home; or such as obtaining stored content from the internet content provider 27, through the hot spot gateway 30, to the client device 22a).

Additionally, the client device 22a includes a memory 52 for storing content. The memory 52 is controlled by the controller 42 and is responsive to user inputs 44 and to certain data messages that may be received by the controller 42 from other client devices 22b-d. For instance, assume that a user of the vehicular client device 22a is listening to broadcast content on a specific satellite channel over the content receiver 48. The user may desire to pause the broadcast content while the user talks to another occupant in the vehicle. The user may then select an input on the keypad or other dedicated button 54 to pause the content. The system may also be configured to automatically generate a pause command upon the initiation of a user action such as the changing of a channel, selecting a mute button on the entertainment system, or turning off the entertainment system or vehicle.

In response to that input (generated directly or indirectly by the user), the controller 42 would use the memory 52 to begin storing the broadcast content on the specific satellite channel to enable the user to play back the content at a later time. Additionally, the memory 52 may be used for storing specific programs of the broadcast content that a user desires to playback at a time that is different from the original broadcast time. For example, as explained below, the controller 42 in the vehicular client device 22a may receive data messages from another client device 22b-d in a different domain (i.e. home or person). That data message may include an instruction to start the recording of a program of the broadcast content (in whole or in part) on a specific satellite channel. Moreover, the memory 52 may be used to download specific content from an Internet content provider 27 through a home gateway 28 or a hot spot gateway 30.

In the embodiment where the client device 22a is incorporated into the head unit 40 of a vehicle, the controller 42 may also be configured to communicate via a vehicle bus interface 68 to a vehicle bus 80, which carries communication information and other operational data throughout the vehicle. This connection may be important to allow the controller 42 to utilize a cellular communication transceiver in the Telematics control unit 70 to transmit and receive data messages. In particular, the Telematics control unit 70 is similarly coupled to the vehicle bus 80, via a vehicle bus interface 72, and hence the head unit 40. The Telematics control unit 70 is responsible for sending and receiving voice or data communications to and from the vehicle over a cellular communication network. As such, it comprises a Telematics controller 74 to organize such communications, and a network access device (NAD) that includes a cellular wireless transceiver 76, which may be used as a second wireless transceiver for purposes of the present invention as described further below.

Figure 5:
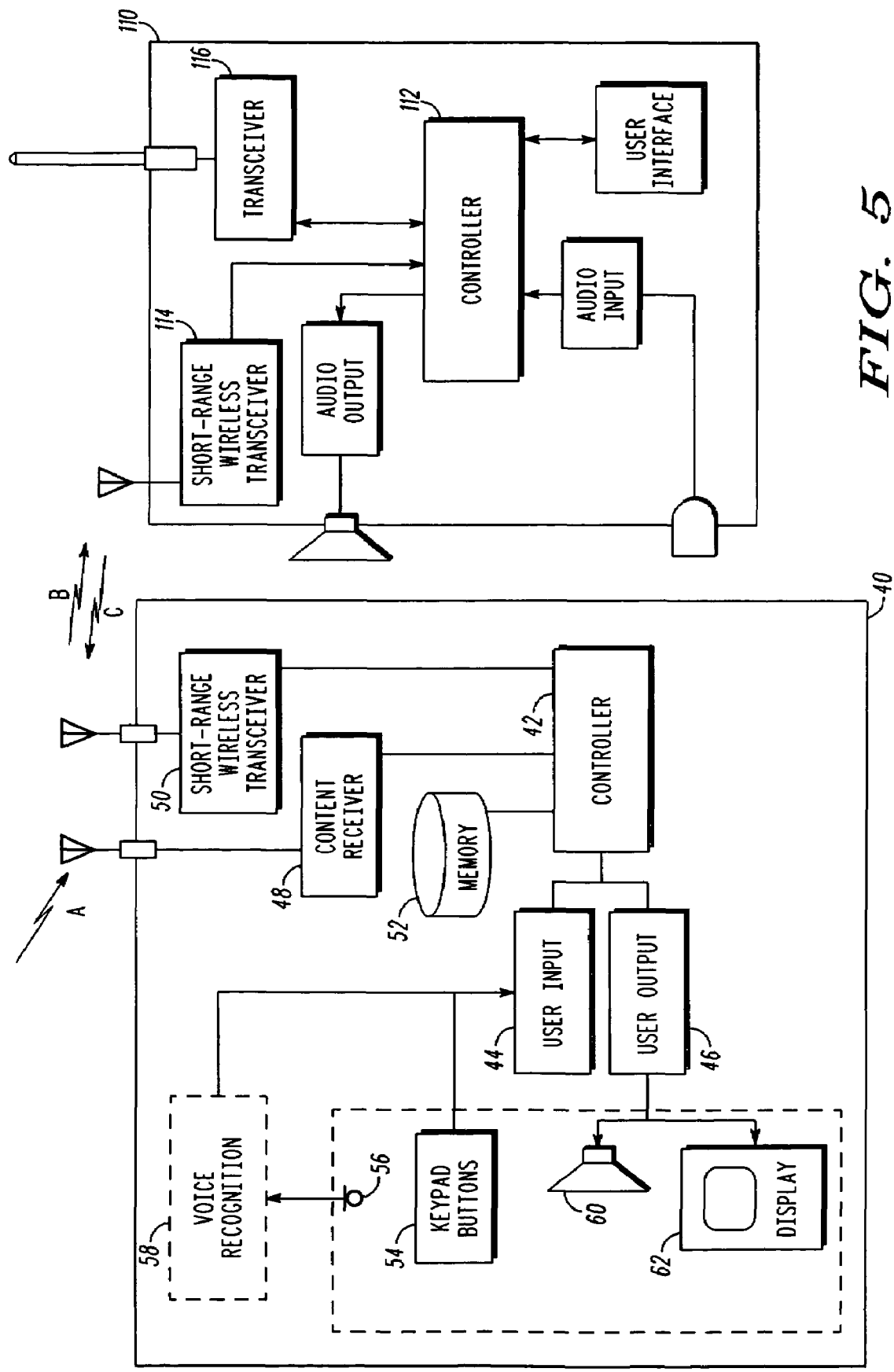
FIG. 5 is a block diagram of another embodiment of a client device in communication with a separate local wireless communication device.

In an alternative embodiment, the client device 22a may be configured to seek out a local wireless communication device to determine whether a data message may be sent over a second wireless communication system. For instance, in FIG. 5, the controller 42 in the client device 22a may determine whether it has access to a second wireless communication network through another wireless communication device 110 that is within proximity of the short-range wireless transceiver 50. Here, the wireless communication device 110, such as a cellular phone, has its own controller 112, a short-range wireless transceiver 114 and a cellular wireless transceiver 116. The short-range wireless transceivers 50 and 114 may communication with each other through a short-range communication protocol such as is set forth in the Bluetooth™ communication system and an IEEE 802.11 communication system. The benefit of this design is that it will allow the controller 42 to utilize a cellular transceiver in the local wireless communication device 110 to transmit and receive data messages, which may be used as a second wireless transceiver for purposes of the present invention as described further below.

The client device 22a illustrated above can provide a great deal of communicative flexibility within vehicle to manage and control content with other client devices 22b-d owned by a user. For example, assume for purposes of illustration that a driver of the vehicle, using client device 22a, is listening to a program of audio broadcast content such as a talk show or a sporting event on the content receiver 48. When the driver arrives at their home, the driver may select an input on the keypad or other dedicated button 54 to pause the playback of the content. Additionally, as mentioned above, the system may also be configured to automatically generate a pause command input upon the initiation of a user action such as the changing of a channel, selecting a mute button on the entertainment system, or turning off the entertainment system or vehicle. In either event, in response to that input, the controller 42 would use the memory 52 to begin storing the broadcast content from the content receiver 48. This would permit the driver to playback the stored content at a later time in the vehicle. Additionally, in response to that input, the controller 42 would generate a data message for transmission to other client devices 22b-d.

In one embodiment, before sending a data message, the controller 42 would determine whether the client device 22a in the vehicle is connected to, or capable of sending messages over, a first wireless communication system. This may be done by having the controller 42 determine whether the first wireless transceiver 50 is connected to a wireless gateway 28 in the home or a hot spot gateway 30 mentioned above. If the client device 22a in the vehicle is not connected to, or not capable of sending data messages over, a first wireless communication system, the controller 42 may then make a determination whether the client device 22a in the vehicle is connected to, or capable of sending data message over, a second wireless communication system. The second wireless communication system in FIG. 2 is shown as a cellular wireless transceiver 72 in the Telematics control unit 70 and in FIG. 5 as a cellular wireless transceiver 116 in a portable wireless communication device 110. If the client device 22a is not connected to either the first or second communication system, then the controller 74 may store the data message for later transmission.

The data message may be formatted in a number of ways. In one embodiment, the information in the data message will depend on the type of content being played by the driver of the vehicle. For instance, assume that the content receiver 48 is a digital satellite receiver and that the type of content to be paused is broadcast content. In this case, the data message may include a plurality of information elements or fields that includes at least a pause content instruction and a satellite channel identification. To enhance the functionality of the system, the data message may also include other information elements or fields such as an address (for identifying a host for the driver's content), a client device identification, a user identification, and a date and a time that the user selected the pause content command. This later information may be used to access content that is not readily storable as well as provide specific information to a user about stored content for later selection.

In another instance, assume that the content receiver 48 is a radio tuner and the type of content to be paused is broadcast content. In this case, the data message may include a plurality of information elements or fields that includes at least a pause content instruction and a radio frequency identification. Additionally, to enhance functionality, the data message may also include other information elements or fields such as an address (for identifying a host for the driver's content), a client device identification, a content type identification, a user identification, and a date and a time that the user selected the pause content command.

In a further instance, assume that the client device 22a contains stored content and the user was listening to a specific song of the stored content or a previously stored broadcast program. In this case, the data message may include a plurality of information elements or fields that includes at least a pause content instruction, a content identification, and a pause location identification. Other information elements or fields that may be included, for enhancing functionality, include an address (for identifying a host for the driver's content), a client device identification, a user identification, and a date and a time that the user selected the pause content command.

FIG. 6 shows a block diagram of one embodiment of a host system 90 for managing content between a first client device (such a client device 22a in a vehicle) and a second client device (such as a client device 22c in the home). In one embodiment, the host system includes a wireless gateway 28, a controller 92, and a database 94. Additionally, the system 90 may include other components such as a user inputs 96, user outputs 98, other memory 100, and a content receiver 102. In one embodiment, components of the host system may be included in one of the client devices 22b, such as a home personal computer. However, one skilled in the art having the benefit of this disclosure will recognize that aspects of the host system, and components thereof, can be combined or swapped with other types of devices and systems. For instance, instead of having the host system located in the home, the controller 92, database 94, and memory 100 may be located and managed remotely by the central service provider 24.

The wireless gateway 28 may include a wireless transceiver 104 and an Internet interface 106. In one embodiment, the wireless transceiver 104 is capable of wirelessly connecting to the first and second client devices 22a, 22c over a short-range wireless communication system such as a Bluetooth™ communication system and an IEEE 802.11 communication system. The Internet interface 106 may be used for communicating with a central service provider 24. The connection with the central service provider 24 may also be used to facilitate communications with the first and second client device 22a, 22c, if the client devices are connected to other wireless gateways (such as a hot spot gateway 30) or connected to another wireless communication system (such as a cellular communication system). Moreover, the connection with the central service provider 24 may be used to facilitate access to content providers in addition to, or separate from, the content receiver 102.

In any event, in addition to transferring stored content to client devices, the wireless gateway 28 is used to receive data messages from the first and second client devices 22a, 22c, including any data messages that have an instruction to pause broadcast content or stored content. In one embodiment, as described above, data messages that are received from a client device include a plurality of information elements or fields that include at least a pause content instruction. If the content is broadcast content, the data message may further include information elements or fields that identify the type of client device, identify the content (a specific satellite channel or a radio frequency), and identify the time and date of the pause instruction. If the content is stored content, the data message may further include information elements or fields that identify the type of client device, identify the content (a specific artist, album, song, or stored broadcast program), and identify the location of the pause instruction.

The database 94 is used by the system to store information regarding features and operations of the different client devices 22a-d. The database 94 may also be used to store user preferences and keep track of user stored content. The database 94 may be configurable by the user to facilitate the storage and playback of content between different client devices 22a-d in various domains. For instance, the database 94 may identify the different types of client devices 22a-d, associated with a particular user. Referring to FIG. 7, the database 94 may also include information specific to individual client devices 22a-d such as: the client device identification (122); the client type (124); the domain (126); whether the client device has a short-range transceiver (128); whether the client device has a cellular transceiver (130); the size of memory on the client device (132); whether the client device retains stored content (134); whether the client device has access to Internet content (136); whether the client device has access to satellite content (138); whether the client device has access to RF radio content (140); and whether the client device has access to cable television (142).

Referring back to FIG. 6, the controller 92 is connected to the wireless gateway 28 and the database 94. The controller 92 is capable of receiving data messages from a first client device 22a and then using the database 94 to identify other client devices 22b-d associated with a specific user. As mentioned above, the data message will include an instruction to pause content and associated information about the paused content. In one embodiment, the controller 92 is capable of generating and sending a second set of data messages to other client devices 22b-d after receiving the data message from the first client device 22a. This may be beneficial if the other client devices 22b-d have their own content receiver and memory.

In another embodiment, the controller 94 is capable of accessing content from the central service provider 24 in response to receiving the data message (containing the pause instruction) from the first client device 22a. This feature may be beneficial if the other client devices 22b-d do not have their own content receiver. Additionally, after accessing content from the central service provider 24, the controller 92 may locally store the content in memory 100 or pass the content onto the other client devices 22c, 22d connected to the host system 90.

Figure 8:
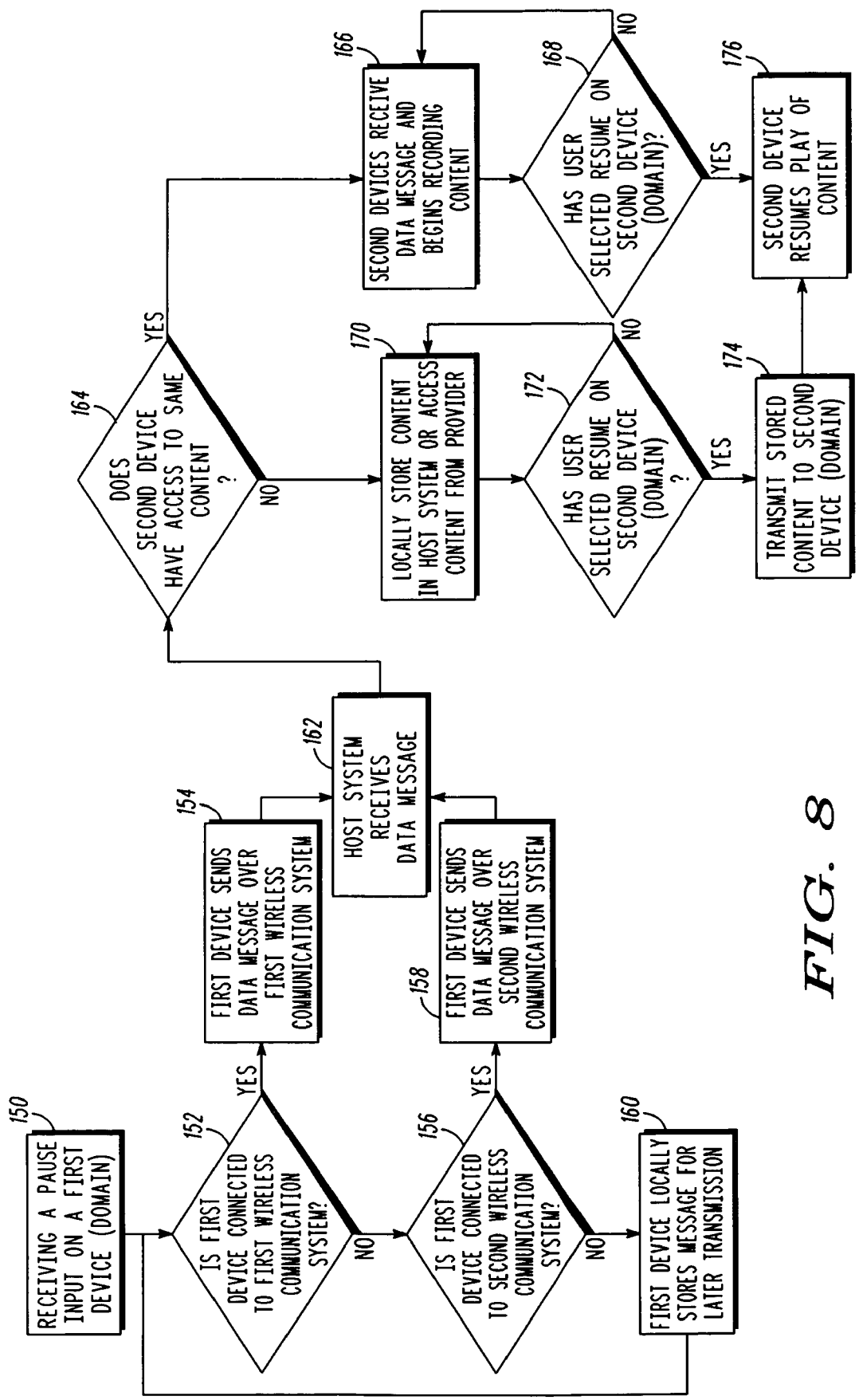
FIG. 8 is a flow diagram of one method for managing content between a first client device and a second client device.

FIG. 8 shows a flow diagram illustrating one embodiment of a method for managing content between a first client device and a second client device. For purposes of illustration, the first client device will be in a first domain and the second client device will be in a second domain. In one embodiment, the method includes a process block 150 that receives an input from a user on the first device to pause the content. As mentioned above, this input may be a direct instruction by the user to pause the content (e.g., by pressing a button on a keypad or a dedicated pause button 54) or the input may be a result of some action taken by the user (e.g., changing a channel, selecting a mute button on the entertainment system, or turning off the entertainment system or vehicle). Moreover, the content may include either broadcast content or stored content. The process then proceeds to decision block 152.

At decision block 152, the first device will make a determination whether the first device is connected to a first wireless communication system. In the context of embodiment described in FIGS. 2 and 3, this may include having the controller 42 determine whether a short-range wireless transceiver 50 is connected to another short-range communication device such as to a home wireless gateway 28 or a hot spot gateway 30. If the first device is connected to the first wireless communication system, then the process proceeds to process block 154.

At process block 154, the first device will generate and transmit a data message over the first communication system to the second device. In one embodiment, as described above, the data message may depend on the type of content being played by the user of the first device. For instance, assume that the type of content to be paused is broadcast content. In this case, the data message may include a plurality of information elements or fields that includes at least a pause content instruction and a broadcast content identification (such as a satellite channel or a radio frequency). To enhance the functionality of the system, the data message may also include other information elements or fields such as an address, a client device identification, a content type identification, a user identification, and a date and a time that the user selected the pause content command.

In another instance, assume that the first device contains stored content and the user was listening to a specific song of the stored content or a previously stored broadcast program. In this case, the data message may include a plurality of information elements or fields that includes at least a pause content instruction, a content identification, and a pause location identification. Other information elements or fields that may be included, for enhancing functionality, include an address, a client device identification, a user identification, and a date and a time that the user selected the pause content command.

In any event, if the first device is not connected to the first wireless communication system, then the process proceeds to decision block 156. In one embodiment, a determination is then made whether the user is capable of connection through a second wireless communication system. As described above, this may be accomplished by having the controller 42 determine whether a data message may be transmitted via a cellular wireless transceiver 72 in a connected Telematics control unit 70 (see FIG. 2). Alternatively, this may be accomplished by having the controller 42 determine whether a data message may be transmitted via a cellular wireless transceiver 116 in a wirelessly connected communication device 110 (see FIG. 5). Moreover, the decision on whether the user is capable of connecting to a second wireless communication system may include a determination of whether the user has subscribed to preferred services plan of the central service provider 24. If so, the process proceeds to process block 158 and where the first device will generate and send a data message over the second communication system.

If the first device is not connected to the first wireless communication system or the second wireless communication system, then the first device 22a will generate a data message but will store the data message instead of immediately transmitting the data message (block 160). In this case, it is preferred that the information in the data message include a paused location for the content such as a date and a time or a record and a track. The process will return to decision blocks 152 and 156 to wait until the first communication device is connected to the first or second wireless communication system.

Once the data message is transmitted, at process block 162, the host system 90 will receive the data message from the first device over the first communication system or the second communication system. As mentioned above, the first communication system may be a short-range wireless communication system transmitted directly to a home gateway 28 or to the home gateway 28 through a remote hot spot gateway 30. The second communication system may be a cellular system that transmits the message to the host system 90 through a cellular network. In response, the host system 90 will generate and send a second data message to other second devices. As explained below, the second data message may be a modified data message that is addressed directly to the second devices associated with the user of the first device and based on the features and capabilities of the second device.

For instance, at decision block 164, the host system 90 may determine from the database 94 whether the second device 22c has access to the content that the user desires to be stored. If the second device has direct access to the same content, then at process block 166, the second device will receive a data message from the host system 90. In response to the data message from the host system, the second device will then begin to record the content based on the information contained in the data message. As illustrated in decision block 168, in one embodiment, the second device will continue to store the content on a particular satellite channel or a radio frequency until the second device receives an input from the user to resume playback of the content on the second device. Alternatively, the second device may be configured to store the content for a predetermined period of time after receiving the pause instruction (such as 2 hours) or may be configured to store the content until a particular program on the broadcast content is completed.

Alternatively, in process block 170, if the second device 22c does not have access to the same content, then the host system may record the content itself or access the content from a content service provider. The ability to access content from a content service provider can provide significant benefits to the user. For instance, if the data message originally sent to the host system is late (e.g., if the data message with the paused instruction was not sent immediately), the host system 90 may connect to a service provider to download the requested content. As illustrated in decision block 172, in one embodiment, the host system 90 will continue to store the content or access the content until the second device receives an input from the user to resume playback of the content on the second device. At process block 174, once the user desires to playback the content, the host system 90 will transmit the stored or accessed content to the second device. The process then proceeds to block 176 where the second device resumes playback of the content.

Figure 9:
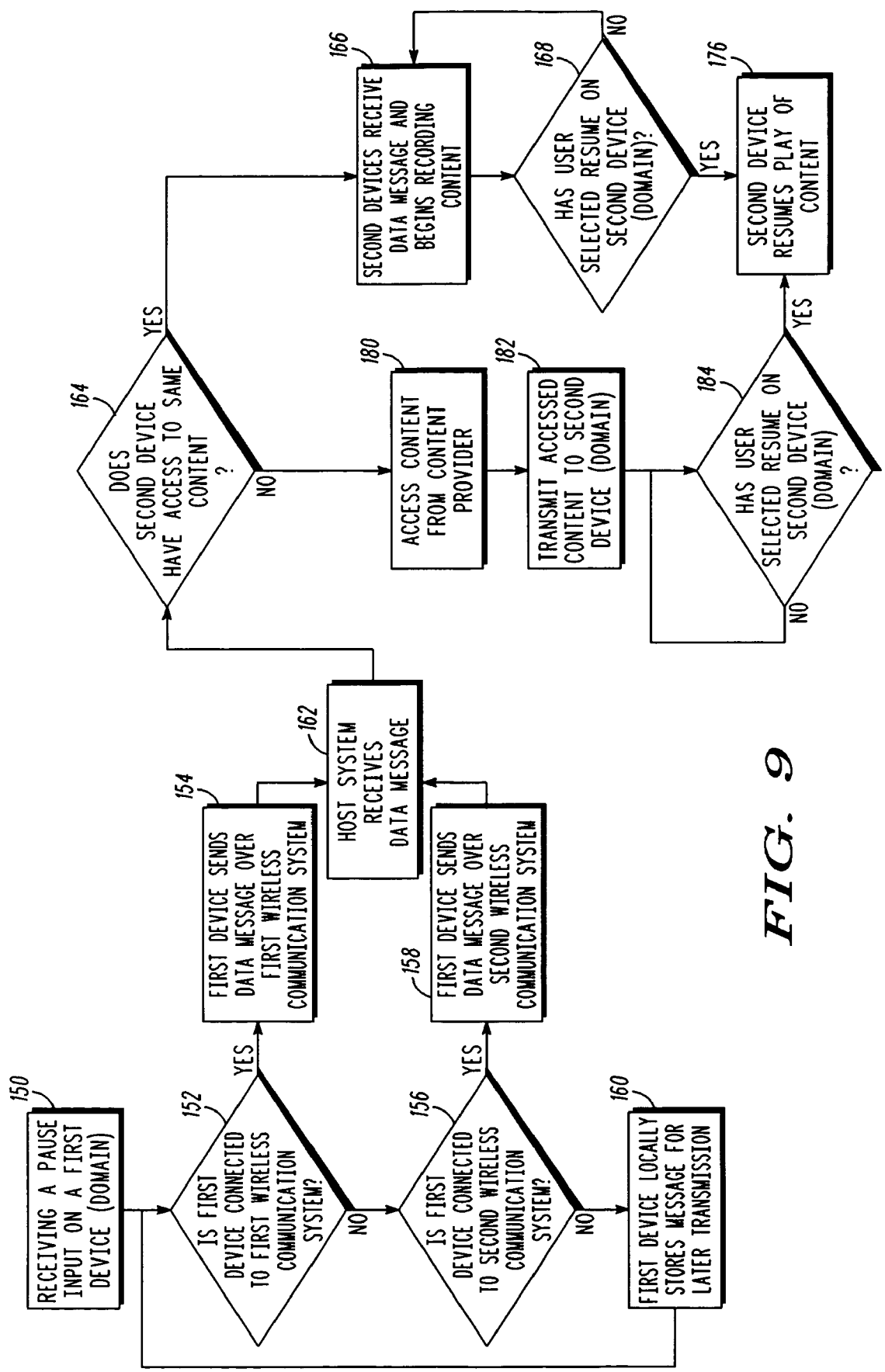
FIG. 9 is a flow diagram of another method for managing content between a first client device and a second client device.

FIG. 9 shows a flow diagram illustrating a further embodiment of a method for managing content between a first client device and a second client device. This method is similar to the one described with relation to FIG. 8, but adds additional steps 180, 182, and 184. In particular, if it is determined that the second device does not have access to the same content (decision block 164), the host system 90 will then access the content from another source (block 180). For instance, the host system 90 could obtain any paused content from the Internet content provider 27 shown in FIG. 1. In process block 182, the host system 90 will then transfer the accessed content to the second device 22c. The transferred content should also include a data message that identifies the content and paused location of the content. Then, in decision block 184, the second device will wait until the user has selected to resume the content on the second device 22c. At that point, the process proceeds to block 176 where the second device resumes playback of the content.

What has been described is a communication system in a vehicle that includes the capability of managing and controlling content between different devices in different domains. The system and method allow a user to seamlessly listen (or watch) audio (or video) content when moving from one domain (such as a vehicle) to a different domain (such as home) without missing a portion of that content.

Although the invention has been described herein by reference to an exemplary embodiment thereof, it will be understood that such embodiment is susceptible of modification and variation without departing from the inventive concepts disclosed. Specifically, any and all wireless communication(s) or wireless communication system(s) may be substituted with wired communication(s) or wired communication system(s), respectively, or a "wireless and wired" hybrid system. In addition, similar to Bluetooth™ and IEEE 802.11, wireless communication protocols such as wireless USB, Zigbee, or any other wireless communication protocol, may be used for wireless communication(s) and/or wireless communication system(s) described above. All such modifications and variations, therefore, are intended to be encompassed within the spirit and scope of the appended claims.

What is claimed is:

1. A method for managing content between a first device and a second device, the method comprising the steps of:
   (a) receiving an input in a first device to pause a content;
   (b) determining whether said first device is connected to a first wireless communication system;
   (c) sending a data message to said second device if said first device is connected to the first wireless communication system; and
   (d) resuming playback of the content on said second device, wherein said first device being in a first domain and said second device being in a second domain, said first domain and said second domain selected from a group consisting of at least the home, vehicle, and person.

2. The method of claim 1 further comprising the step of storing said content in said second device prior to step (a).

3. The method of claim 1 further comprising the step of storing said content in said second device after receiving said data message from step (c).

4. The method of claim 1, wherein said first device and said second device is selected from a group consisting of a vehicular entertainment system, a home entertainment system, and a portable electronic device.

5. The method of claim 1, wherein said content is broadcast content and received by a digital satellite communication system.

6. The method of claim 5, wherein said data message comprises a plurality of information elements including at least a pause content instruction and a satellite channel identification.

7. The method of claim 1, wherein said content is broadcast content received by a radio tuner.

8. The method of claim 7, wherein said data message comprises a plurality of information elements including at least a pause content instruction and a radio frequency identification.

9. The method of claim 1, wherein said content is stored content received by a content provider through a wireless gateway.

10. The method of claim 1, wherein said content is video and said first device is a digital video recorder and said second device is a vehicular video entertainment system.

11. The method of claim 1, wherein said content is video and said first device is a digital video recorder and said second device is a portable digital video recorder.

12. The method of claim 1 further comprising the step of storing said data message in the first device if it is determined that said first device is not connected to the first wireless communication system.

13. The method of claim 1, wherein said first wireless communication system is at least one of a short range wireless communication system, an IEEE 802.11 communication system, a wireless USB communication system, and a low power radio frequency communication system.

14. The method of claim 13, wherein said first device has a first transceiver to communicate with said first wireless communication system and a second transceiver to communicate with a second wireless communication system.

15. The method of claim 14, wherein said second wireless communication system is a cellular communication system.

16. The method of claim 15 further comprising the steps of determining whether said first device is connected to said second wireless communication system, and sending said data message to said second device if said first device is connected to said second wireless communication system.

17. The method of claim 16 further comprising the step of storing said data message in said first device if it is determined that said first device is not connected to said second wireless communication system.

18. The method of claim 14 further comprising the steps of determining whether said first device is subscribed to a preferred service plan, and connecting to said second wireless communication system if it is determined that said first device is subscribed to the preferred service plan.

19. The method of claim 1 further comprising the step of determining whether said content is broadcast content or stored content prior to sending said data message to said second device.

20. The method of claim 19 wherein, if it is determined that said content is broadcast content, said data message comprising a plurality of information elements including at least a pause content instruction and a satellite channel identification.

21. The method of claim 19 wherein, if it is determined that said content is stored content, said data message comprising a plurality of information elements including at least a pause content instruction, a content identification, and a pause location identification.

22. The method of claim 1 further comprising the steps of:
receiving said data message in a host system, said host system connected to a wireless gateway;
determining in said host system whether said second device has access to the content;
sending a second data message to said second device if it is determined that said second device has access to the content.

23. The method of claim 22 further comprising the step of:
accessing said content from a central service provider in response to receiving said data message in the host system.

24. The method of claim 23 further comprising the step of sending said content accessed from said central service provider to said second device in response to a playback instruction.

25. A client device in a communication system, the communication system being capable of managing content between the client device and other client devices, the client device and other client devices being in other domains, the domains selected from a group consisting of at least the home, vehicle, and person, the client device comprising:
a user interface for receiving an input to pause said content;
a first wireless transceiver that is capable of wirelessly connecting the client device to a first wireless communication system;
a controller, responsive to the input to pause said content, for determining whether said client device is connected to said first wireless communication system and sending a data message to a wireless gateway if said client device is connected to said first wireless communication system, wherein said data message sent to said wireless gateway comprises a plurality of information elements including at least a pause content instruction.

26. The client device of claim 25, wherein said client device is selected from a group consisting of a vehicular entertainment system, a home entertainment system, and a portable electronic device.

27. The client device of claim 25, wherein said client device further comprises a satellite radio receiver, the content being broadcast content received from the satellite radio receiver.

28. The client device of claim 27, wherein the plurality of information elements of said data message further includes at least a satellite channel identification.

29. The client device of claim 25, wherein the client device further comprises a radio tuner, the content being broadcast content received from the radio tuner.

30. The client device of claim 29, wherein the plurality of information elements of the data message further includes at least a radio frequency identification.

31. The client device of claim 25, wherein said content is stored content received by a content provider through a wireless gateway.

32. The client device of claim 25, wherein said content is video and said client device is a home digital video recorder.

33. The client device of claim 25, wherein said first wireless communication system is at least one of a short range wireless communication system, an IEEE 802.11 communication system, a wireless USB communication system, and a low power radio frequency communication system.

34. The client device of claim 33, wherein said client device further comprises a second wireless transceiver that is capable of wirelessly connecting said client device to a cellular wireless communication system.

35. The client device of claim 34, wherein said controller sends said data message through said second wireless transceiver if said client device is not connected to the first wireless communication system.

36. The client device of claim 35, wherein said controller further determines whether said client device is subscribed to a preferred service plan and sends said data message through said second wireless transceiver if said client device is subscribed to said preferred service plan.

37. The client device of claim 25, wherein said controller further determines whether said content is broadcast content or stored content prior to sending said data message to said wireless gateway.

38. The client device of claim 37, wherein the plurality of information elements of said data message further includes at least a satellite channel identification if it is determined that the content is broadcast content.

39. The client device of claim 37, wherein the plurality of information elements of said data message further includes at least a content identification and a pause location identification if it is determined that said content is stored content.

40. The client device of claim 25, wherein said wireless gateway is in a home domain and connected to a host system, said host system having a database that contains information about other client devices associated with a user of said client device.

41. A communication system for managing content between a first device and a second device, the communication system comprising:
- a wireless gateway for receiving a first data message from a first device, said first data message comprising a plurality of information elements including at least a pause content instruction;
- a database for storing information regarding said first device and a second device; and
- a controller connected to said wireless gateway, said controller capable of identifying said second device from said database and sending a second data message to said second device in response to receiving said first data message from said first device;
- wherein said first device being in a first domain and said second device being in a second domain, said first domain and said second domain selected from a group consisting of at least the home, vehicle, and person.

* * * * *